US011021813B2

(12) United States Patent
Mathon et al.

(10) Patent No.: US 11,021,813 B2
(45) Date of Patent: Jun. 1, 2021

(54) PREFORM TAKE-UP IN A JACQUARD LOOM

(71) Applicant: SAFRAN AIRCRAFT ENGINES, Paris (FR)

(72) Inventors: Richard Mathon, Brunoy (FR); Dominique Michel Serge Magnaudeix, Evry-Gregy sur Yerres (FR); Claire Rousseau, Paris (FR); Bertrand Pierre Martin Leroyer, Le Havre (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 111 days.

(21) Appl. No.: 15/887,934

(22) Filed: Feb. 2, 2018

(65) Prior Publication Data

US 2018/0223456 A1    Aug. 9, 2018

(30) Foreign Application Priority Data

Feb. 3, 2017    (FR) ........................................ 1750921

(51) Int. Cl.
*D03C 3/24*    (2006.01)
*D03D 49/20*    (2006.01)
(Continued)

(52) U.S. Cl.
CPC ............. *D03C 3/24* (2013.01); *D03D 25/005* (2013.01); *D03D 41/004* (2013.01); *D03D 49/20* (2013.01);
(Continued)

(58) Field of Classification Search
CPC ..... B29B 11/16; B29C 70/222; B29C 70/462; B29C 70/021; B29C 70/24; B29C 70/30;
(Continued)

(56) References Cited

U.S. PATENT DOCUMENTS 4,467,838 A * 8/1984 Rheaume ................. D03D 3/00
139/305
5,394,906 A * 3/1995 Farley ..................... B29B 11/16
139/11

(Continued)

FOREIGN PATENT DOCUMENTS

FR        3037976        12/2016

OTHER PUBLICATIONS

"Take-up Motion | Let-off Motion | Secondary Motions of Weaving Loom Mechanism"; https://textilelearner.blogspot.com/2011/06/take-up-motion-let-off-motion-secondary_5888.html; Jun. 2011. Accessed Aug. 10, 2020. (Year: 2011).*

(Continued)

*Primary Examiner* — Robert H Muromoto, Jr.
(74) *Attorney, Agent, or Firm* — Womble Bond Dickinson (US) LLP

(57) ABSTRACT

Jacquard loom for producing a woven preform from several warp yarns and several weft yarns, the loom including a device for taking up the preform when it is being produced, in order to move it along an axis (X) as it is being formed, which axis is substantially parallel to a production direction for the preform, characterised in that the loom also includes a control for rotating the preform, substantially about the axis.

8 Claims, 3 Drawing Sheets

(51) Int. Cl.
*D03D 25/00* (2006.01)
*F01D 5/14* (2006.01)
*D03D 41/00* (2006.01)

(52) U.S. Cl.
CPC .......... *F01D 5/14* (2013.01); *D03D 2700/19* (2013.01); *D10B 2505/02* (2013.01); *F05D 2230/50* (2013.01); *F05D 2300/6012* (2013.01)

(58) Field of Classification Search
CPC ........ B29C 70/40; D03D 3/08; D03D 25/005; D03D 49/04; D03D 49/20; D03D 41/004; D03D 3/00; D03D 49/12
See application file for complete search history.

(56) References Cited

U.S. PATENT DOCUMENTS

| | | | |
|---|---|---|---|
| 6,003,564 A | 12/1999 | Cahuzac et al. | |
| 8,883,660 B2* | 11/2014 | Goering | B29B 11/16 442/203 |
| 9,186,850 B2* | 11/2015 | Goering | B29B 11/16 |
| 10,190,240 B2* | 1/2019 | Goering | B29B 11/16 |
| 10,233,572 B2* | 3/2019 | Rousseau | D03C 3/12 |
| 10,309,043 B2* | 6/2019 | Hellot | D03D 41/004 |
| 2005/0084377 A1* | 4/2005 | Dambrine | B29C 70/48 416/223 R |
| 2005/0146076 A1* | 7/2005 | Alexander | D03D 1/0088 264/257 |
| 2009/0202763 A1* | 8/2009 | Rose | B32B 5/024 428/36.1 |
| 2009/0325443 A1* | 12/2009 | Blackden | B29C 70/222 442/203 |
| 2011/0086565 A1* | 4/2011 | Goering | B29B 11/16 442/203 |
| 2011/0097526 A1* | 4/2011 | Goering | B29B 11/16 428/36.1 |
| 2012/0208419 A1* | 8/2012 | Dommes | B29B 11/16 442/327 |
| 2015/0132487 A1* | 5/2015 | Goering | B29B 11/16 427/248.1 |
| 2015/0174833 A1* | 6/2015 | Desjoyeaux | B29C 70/222 264/241 |
| 2016/0376734 A1* | 12/2016 | Rousseau | D03C 3/12 139/11 |
| 2017/0175308 A1* | 6/2017 | Provost | B29C 70/24 |
| 2018/0304421 A1* | 10/2018 | Marchal | B29B 11/16 |

OTHER PUBLICATIONS

Safran Aircraft Engines, "French Search Report," FR Application No. 1750921 (dated Sep. 21, 2017) (with English translation cover sheet).

* cited by examiner

PREFORM TAKE-UP IN A JACQUARD LOOM

TECHNICAL FIELD

The present invention relates to a Jacquard loom for producing a woven preform, which is preferably 3D, and more particularly to the take-up of said preform when it is being produced by said loom.

PRIOR ART

The prior art includes in particular EP-A1-1 526 285, FR-A1-3 037 976, U.S. Pat. No. 6,003,564, U.S. Pat. No. 4,467,838 and WO-A2-2013/088037.

FIG. 1 schematically shows a Jacquard loom 10 used to produce three-dimensional (3D) preforms made by multilayer weaving between a plurality of layers of warp yarns 30 and a plurality of layers of weft yarns 31.

In a known manner, the loom 10 is provided with a Jacquard mechanism 11, which is supported by a superstructure (not shown in FIG. 1). The loom 10 also comprises a harness 20 consisting of a comber board 21 and control yarns or heddles 22, one end of each heddle 22 being connected to a control hook 12 of the Jacquard mechanism 11 and the other end of said heddle being connected to one of the return springs 13 secured to the frame 14 of the loom 10.

Each heddle 22 comprises an eye 23 through which a warp yarn 30 passes. The heddles 22 and the associated eyes 23 thereof are driven in a substantially vertical oscillation movement, indicated by the double-headed arrow F, under the effect of the pull forces exerted thereon by the control hooks 12 and the return springs 13, respectively. The heddles 22 make it possible to raise some of the warp yarns 30 and thus create a shed 15 for introducing weft yarns 31. More specifically, each heddle 22 is actuated and controlled individually, and this makes it possible to pull each warp yarn 30 up or down. This makes it possible to produce the spacing between the warp yarns that is required in order for a rapier carrying the weft yarn 31 to pass through, and to weave complex patterns and transfer the warp yarns from one layer to the next, thus allowing a three-dimensional fibrous architecture to be created. After each time a weft yarn 31 passes through the shed, a doffer comb 38 compacts the fabric coming out of the loom.

The heddles 22 are spatially distributed according to the position of the holes 210 in the comber board 21, i.e. in a plurality of columns 211 and rows 212. The density of the holes 210 in the comber board corresponds to the density of the fabric to be produced, i.e. the spacing between each column of holes in the comber board is the same as the spacing between each warp column in the fabric to be produced.

Some fibrous structures, such as those for forming reinforcements for aeronautical engine blades made of composite material, require a very dense weave having a relatively high thread count, in particular warp count, in order to provide the part with a high level of mechanical strength. The warp count corresponds to the number of warp yarns per unit length. Therefore, if it is desired that a weave be formed that has a high warp count, the space between the columns of holes in the comber board has to be reduced, and this results in the heddles of one column, for example the heddles 22 of column l1, being brought closer to the heddles of the adjacent column(s), for example column l2 in this case. If the heddles of two adjacent columns are too close together, however, the movement of the heddles, and more particularly of the associated eyes thereof, is hindered as a result of the heddles being close to the warp yarns in the adjacent column.

It is standard practice to provide a Jacquard loom with a digital control system and to weave structures, in an automated manner, that have variations in thickness, variations in width and regions of separation. These fibrous preforms are then injected with a thermosetting resin in order to produce, inter alia, turbojet engine parts, such as fan blades, a retention casing and guide vane assemblies.

3D Jacquard weaving is different from conventional frame-based 2D Jacquard weaving on account of the position of the harness and the fact that each heddle is controlled individually. In 2D Jacquard weaving, the incoming warp yarns are in a single layer, whereas in 3D Jacquard weaving the warp yarns enter the mechanism in several layers.

In particular, when the fibrous preform to be woven is thick, the harness 20 can be tightly packed for the reasons indicated above. If the harness is full to capacity, this can cause very high levels of friction and create weaving defects. Movements of the heddles cause a length of warp yarn to be taken up. The taken-up yarn may, for example, drive an adjacent yarn as a result of friction. Furthermore, the taken-up yarn no longer returns to its neutral position in the harness due to the friction.

Controlling the tension in the warp yarns is extremely important for the reduction of occurrences of weaving defects. In order to control the tension, the bobbins that supply the warp yarns are mounted on a creel (not shown in FIG. 1) located upstream of the loom. Depending on the manufacturer, the bobbins are provided with a braking system for passively adjusting the tension, and with weights or springs capable of absorbing the excess yarn length when the heddle returns to its neutral position. The number of bobbins in a creel is typically between 200 and 5,000.

A device for taking up the preform during the production thereof is provided downstream of the loom, i.e. at the output of the loom. Said device is schematically indicated by reference numeral 40 in FIG. 1. The device 40 is intended to pull on the preform and in particular on the warp yarns in order to provide a particular tension in said yarns. The device makes it possible to move the preform along an axis X as it is being formed. In general, said device is a motorised device which makes it possible to drive the warp yarns during weaving such that, when all of the weft yarns in one column have been inserted in the preform, the device is moved the distance between two columns. This is how the spacing between the weft columns is controlled.

In the particular case of weaving fan blades, the current technique consists in flat weaving the preform. The strands of warp yarns are perpendicular to the strands of weft yarns. Weaving starts at the root of the blade so as to end with the top of the blade; the warp yarns are positioned along the length of the part. Owing to the twist thereof, a distinctive feature of the blade is that it has longer warp strands on the leading and trailing edges than in the centre of the blade.

Since the preform is flat woven, the blade is shaped manually over a counter mould after removing the weave pattern from the frame.

One of the objects of the present invention is to improve the production of this type of part by changing the length of the warp strands according to the position thereof in the part. It would therefore be necessary for the differences in the length of the warp strands to be generated directly during the process of weaving the preform. This would make it possible to reduce the buckling of the fibres, which is a problem currently encountered when the flat woven preform is shaped over the counter mould.

The present invention proposes a way of addressing this need which is simple, effective and economical.

DISCLOSURE OF THE INVENTION

The invention proposes a Jacquard loom for producing a woven preform, which is preferably 3D, from a plurality of warp yarns and a plurality of weft yarns, said preform having a predetermined number of columns of warp yarns per unit length and a predetermined number of warp yarn layers per unit length, said loom comprising a device for taking up the preform when it is being produced, in order to move it along an axis as it is being formed, which axis is substantially parallel to a production direction for the preform, characterised in that said loom also comprises means for rotating said preform, substantially about said axis.

The invention therefore proposes means for rotating the preform and therefore for twisting the preform during the weaving process on a Jacquard loom. During weaving, the preform is driven by the device and, preferably simultaneously, guided so as to achieve twisting when said preform is being advanced.

Rotating the preform about the axis mechanically creates different take-ups for the warp yarns, by the length of the side yarns being increased by comparison with the central yarns. As a result of the preform rotating, the warp yarns that are furthest from the rotational axis will be longer than those in the centre. The rotational axis of the preform is preferably close to the neutral axis of said preform. The weft yarns are always intended to be inserted by means of the rapier after the shed between the warp yarns has been opened.

The loom according to the invention may comprise one or more of the following features, taken independently or in combination:
- said preform has a predetermined number of columns of warp yarns per unit length and a predetermined number of warp yarn layers per unit length,
- said take-up device comprises means for securing one end of the preform or ends of warp yarns of the preform;
- the means for rotating the preform are means for rotating said take-up device;
- said take-up device is generally wheel-shaped;
- the loom comprises a system for controlling the movement and rotation relative to said axis of said device;
- the loom comprises means for supporting the preform during the production thereof, said support means being designed to hold the preform while it is being rotated;
- said support means comprise wedges designed to be arranged on two opposite faces of the preform;
- said support means also comprise means for holding the wedges against said faces, said holding means being actuators, for example;
- said support means comprise conveyor belts designed to be arranged on two opposite faces of the preform.

The present invention also relates to a method for producing a woven preform, which is preferably 3D, using a Jacquard loom and from a plurality of warp yarns and a plurality of weft yarns, said preform having a predetermined number of columns of warp yarns per unit length and a predetermined number of warp yarn layers per unit length, said method comprising a step of:
- taking up the preform when it is being produced, in order to move it along an axis as it is being formed, characterised in that it comprises a step of:
- rotating the preform, substantially about said axis.

Advantageously, the method comprises a step of:
- holding the preform while it is being rotated, in particular by pressing, rolling or sliding support means on two opposite faces of the preform.

DESCRIPTION OF THE DRAWINGS

The invention will be better understood and further details, features and advantages of the invention will become more clearly apparent upon reading the following description, given by way of non-limiting example, and with reference to the accompanying drawings, in which.

DETAILED DESCRIPTION

Figure 1:
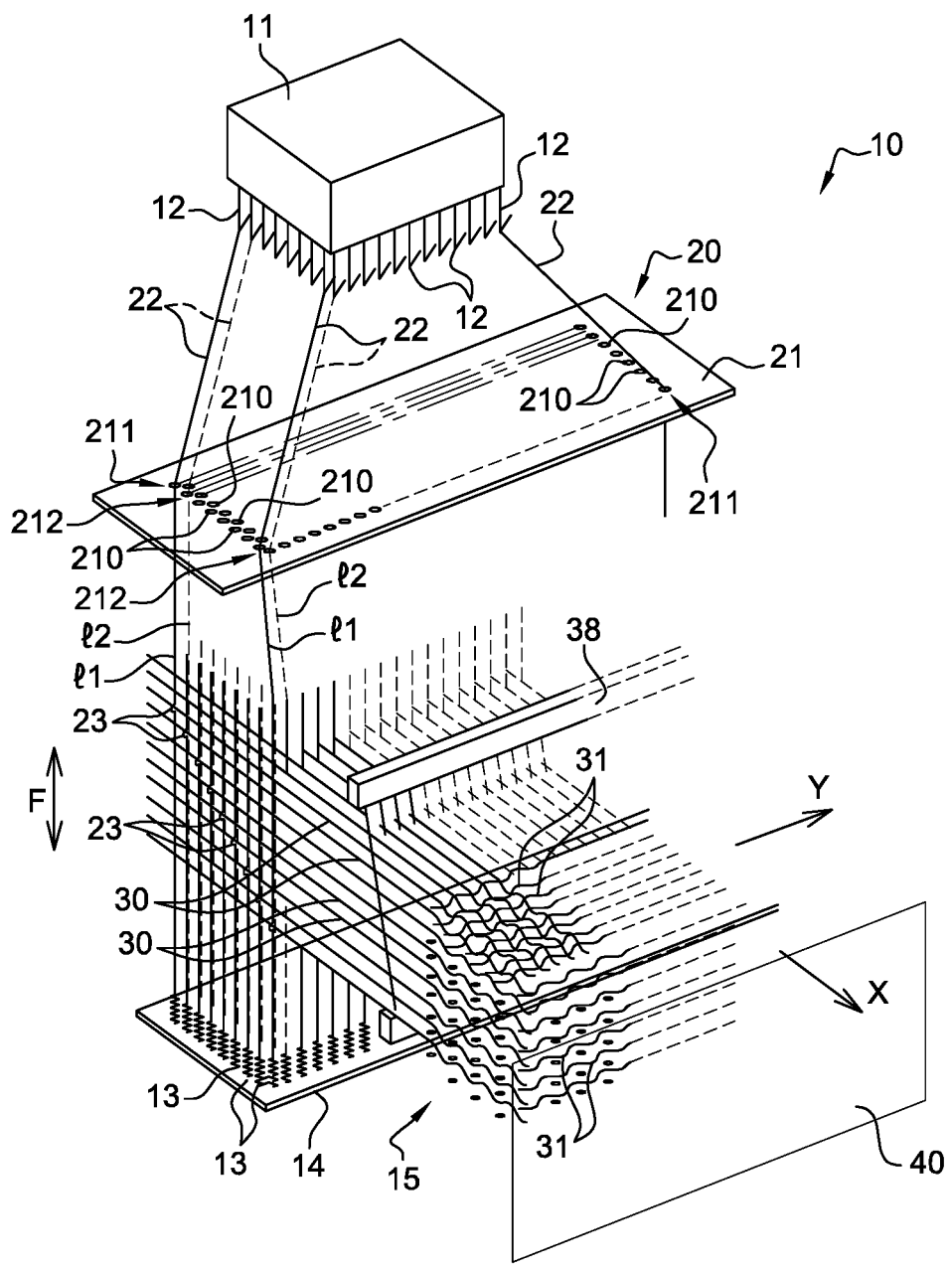
FIG. 1 is a schematic partial perspective view of a Jacquard loom.
Figure 2:
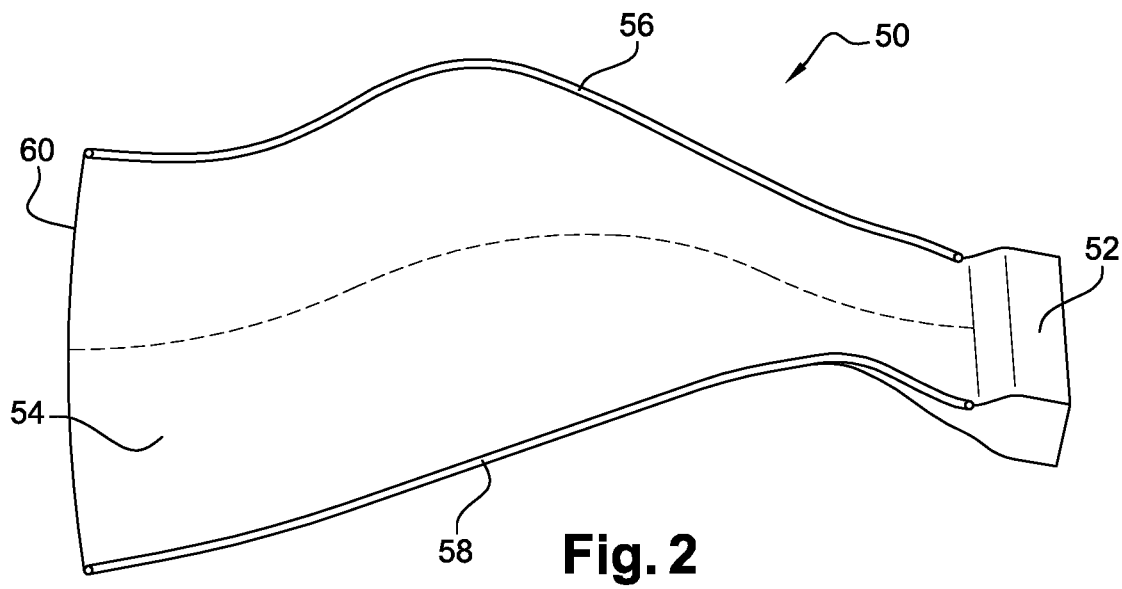
FIG. 2 is a schematic perspective view of a preform of a fan blade.

FIG. 2 shows a 3D woven preform 50 for producing a fan blade of a turbine engine, said preform having been made by weaving in a Jacquard loom as shown in FIG. 1, which is described above.

The preform 50 is generally elongate along an axis X. At one longitudinal end, said preform comprises a portion intended for forming the root 52 of the fan blade. The remainder of the preform 50 is intended for forming the body 54 of the blade. The root 52 is generally thicker than the blade body 54, as shown in the drawing. In a known manner, the blade body comprises a leading edge 56 and a trailing edge 58, and the longitudinal end of the preform opposite the root 52 is intended for forming the top 60 of the blade body.

This preform 50 is intended for being received in a mould into which the polymerisable resin is injected. After the preform has been impregnated, the resin hardens and a rough fan blade is made which, in general, then undergoes finishing processes.

When producing the preform using the loom, the root 52 is produced first. As mentioned above, the warp yarns of the shed are secured to the take-up device, and the weft yarns start to be inserted between the warp yarns when production of the preform has begun, and therefore so as to produce the root. The weaving process continues with the production of the blade body and does not end until production of the preform is complete.

In practice, it is the root of the blade to be produced that is produced first; however, when weaving begins, there is a large portion of the preform that will be cut out at a later stage so as to obtain the final shape of the blade. The final shape of the blade may therefore be different from that of the preform.

The current technique consists in flat weaving the preform, which has the drawbacks described above. The preform is shaped manually over a counter mould so as to make a twist in the preform, and this tends to cause the fibres to buckle, in particular on the leading and trailing edges of the preform, where the fibres are subject to high levels of stress during this shaping.

Figure 3:
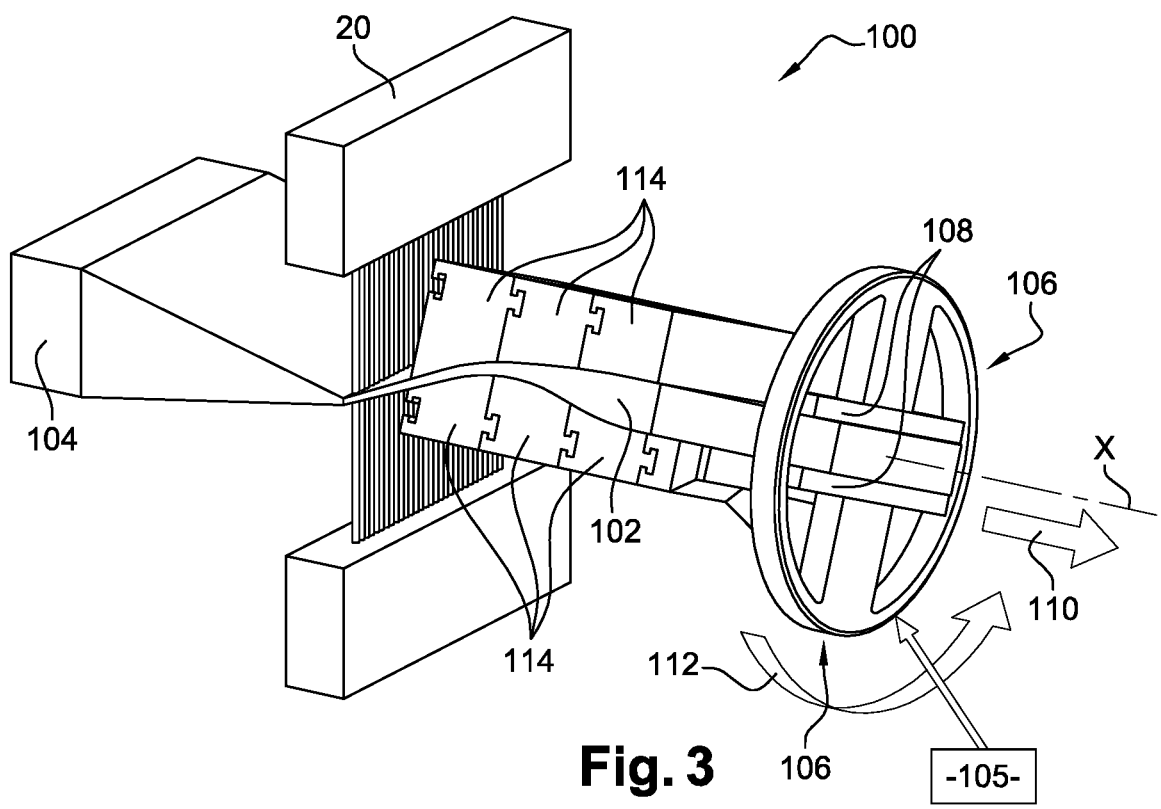
FIG. 3 is a schematic partial perspective view of a loom according to the invention.

FIG. 3 shows an embodiment according to the invention. It is a partial and very schematic view of a Jacquard loom 100 which can, however, be considered to have all the features of the loom 10 from FIG. 1.

The loom 100 is used to produce a three-dimensional preform, which is in this case a fan blade. The preform 102 is made by multilayer weaving between a plurality of layers of warp yarns and a plurality of layers of weft yarns. As mentioned above, a creel 104 is located upstream of the loom 100 and a device 106 for taking up the preform is located downstream thereof. Reference numeral 20 in FIG. 3 denotes the harness of the Jacquard mechanism.

The take-up device 106 is used to pull on the preform 102 and in particular on the warp yarns in order to provide a particular tension in said yarns. For this purpose, the device comprises means 108 for securing one end of the preform 102, preferably the root thereof, or ends of the above-mentioned warp yarns.

The device 106 is connected to motorised control means 105 which make it possible to move the device 106, and therefore the preform 102, along an axis X as the preform is being formed (arrow 110). This axis is preferably parallel to the axis of the loom and/or parallel to the warp yarns.

Moreover, these motorised control means 105 are also designed to rotate the device 106, and therefore the preform 102, about the axis X as the preform is being formed (arrow 112).

Rotating the preform 102 causes the preform to twist during the weaving process. This twisting results in different take-ups for the warp yarns, by the length of the side yarns being increased, on the leading and trailing edges of the preform, by comparison with the central yarns of the preform that are close to the rotational axis X.

As shown in FIG. 3, the preform 102 is advantageously held by support means 114 for guiding this twisting.

In the embodiment in FIG. 3, the support means 114 comprise wedges, a first set of which are arranged on one face of the preform 102, such as its pressure face, and a second set of which is arranged on the opposite face of the preform, such as its suction face.

Each set comprises three wedges that are arranged one next to the other and can comprise respective fitting means so that they are kept together. The wedges are preferably positioned on the preform during the production thereof. Therefore, a first wedge can be mounted on the preform on or close to the root thereof, and on either side thereof. Then, as the preform is produced, two other wedges are mounted on the pressure face and suction face of the preform, respectively, and so on until all of the wedges are mounted thereon and the production of the preform is complete.

The geometry of the wedges is preferably defined according to the intended shape of the preform, including any floats. The floats are the ends of the yarns that are woven only in part, it being intended that said surplus be cut off at a later stage.

Figure 4:
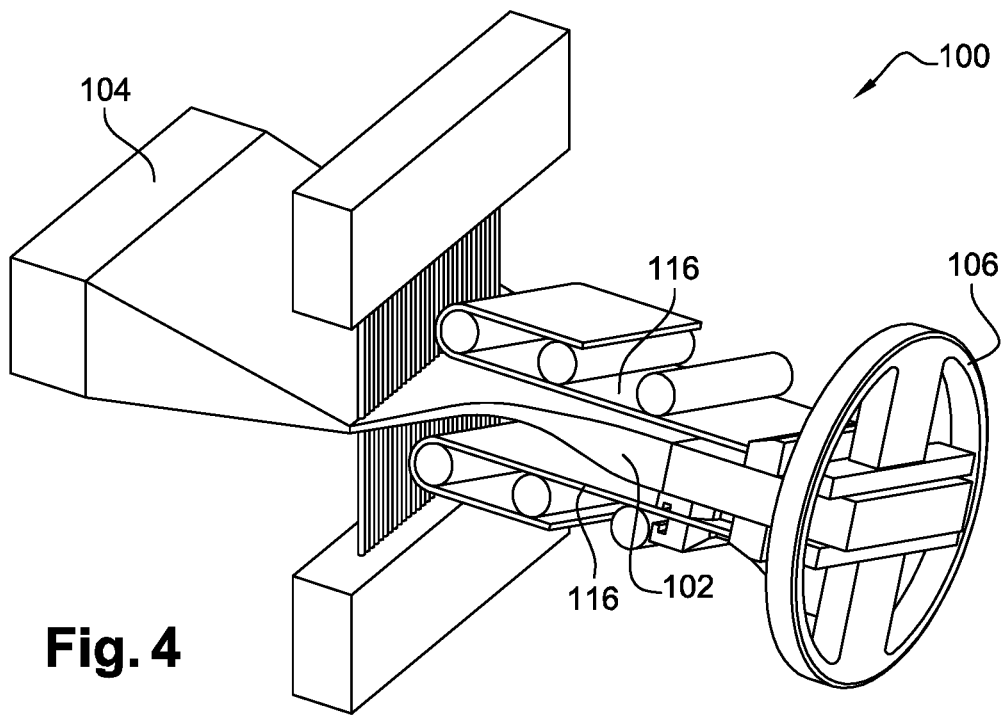
FIGS. 4 and 5 are views similar to that of FIG. 3, showing variants of the invention.
Figure 5:
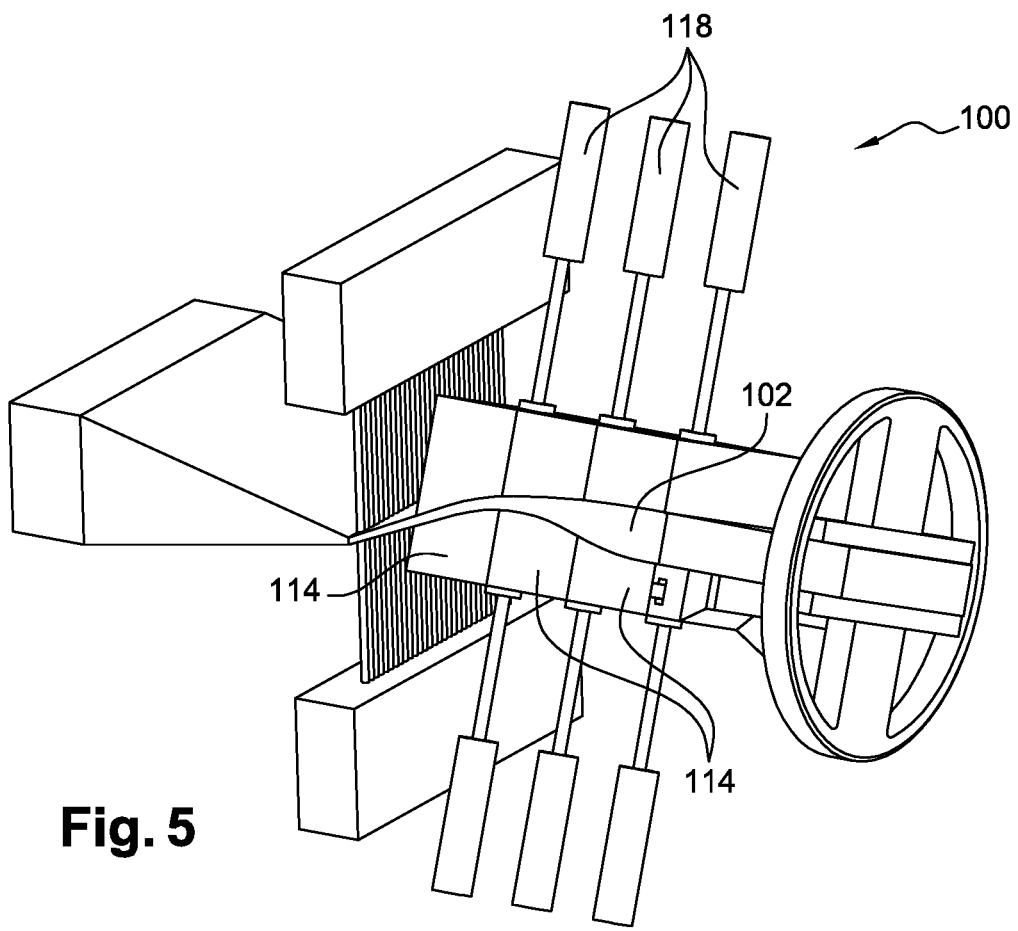

FIGS. 4 and 5 show variants of the invention that differ from the previous embodiment substantially on account of the means for supporting the preform 102 during production.

In the case shown in FIG. 4, the two faces of the preform are supported by conveyor belts 116. In the case shown in FIG. 5, the preform is supported by wedges which are similar to those in FIG. 3, but are biased or held against the aforementioned faces of the preform by means of actuators 118 or similar means. The actuators can be controlled and driven by the movement of the device 106.

The invention also relates to a method for producing the preform using the loom 100, comprising the steps of taking up the preform when it is being produced, in order to move it along an axis X as it is being formed and rotate it substantially about said axis. At the start of the weaving process, all of the warp yarns are clamped in place by the securing means 108 of the device 106. Weaving starts with the root and the device 106 advances along the axis X without rotating. The device 106 advances by one pitch once all of the weft yarns in one column have been inserted between the warp yarns. The device 106 starts to rotate when the preform is being woven, and does so according to the twist therein. This rotation is carried out by the means 105 that can comprise a stepper motor controlled by the digital control system of the device 106. The embodiments of the loom 100 from FIGS. 3 to 5 also makes it possible to hold the preform while it is being rotated, in particular by pressing (FIGS. 3 and 5), or rolling or sliding (FIG. 4) the support means on two opposite faces of the preform 102.

The invention claimed is:

1. Jacquard loom for producing a woven preform from a plurality of warp yarns and a plurality of weft yarns, said loom comprising a device for taking up the preform when it is being produced, in order to move it along an axis as it is being formed, which axis is substantially parallel to a production direction for the preform, wherein the loom also comprises means for rotating the preform, substantially about said axis, wherein said take-up device comprises means for securing one end of the preform or ends of warp yarns of the preform and wherein the means for rotating the preform are means for rotating said take-up device, said loom further comprising means for supporting the preform during the production thereof, said support means being designed to hold the preform while it is being rotated and comprising wedges designed to be arranged on two opposite faces of the preform and means for holding the wedges against said faces, said holding means comprising at least one actuator designed to bias or hold said wedges against said opposite faces of the preform.

2. Jacquard loom according to claim 1, wherein it comprises a system for controlling the movement and rotation relative to said axis of said device.

3. Jacquard loom according to claim 1, wherein said support means comprise conveyor belts designed to be arranged on two opposite faces of the preform.

4. Method for producing a woven preform using a Jacquard loom and from a plurality of warp yarns and a plurality of weft yarns, said preform having a predetermined number of columns of warp yarns per unit length and a predetermined number of warp yarn layers per unit length, said method comprising:
   moving said preform along an axis as said preform is being formed, which axis is substantially parallel to a production direction for the preform;
   supporting the preform during the production thereof, to hold the preform while said preform is being rotated using wedges arranged on two opposite faces of the preform;
   holding the wedges against said faces with at least one actuator to bias or hold said wedges against said opposite faces of the preform;
   rotating the preform, substantially about said axis.

5. Method according to claim 4, wherein the holding is pressing, rolling or sliding said wedges against said two opposite faces of the preform.

6. Jacquard loom according to claim 1, wherein said wedges are arranged one next to the other and comprise fitting means for keeping them together.

7. Jacquard loom according to claim 1, wherein said at least one actuator is driven by the movement of the device for taking up the preform.

8. Method according to claim 4, wherein the preform is simultaneously moved along the axis and rotated about said axis.

* * * * *